(12) United States Patent
Nishikawa

(10) Patent No.: US 8,210,693 B2
(45) Date of Patent: Jul. 3, 2012

(54) PROJECTION TYPE IMAGE DISPLAY APPARATUS AND PROJECTION OPTICAL SYSTEM

(75) Inventor: Jun Nishikawa, Tokyo (JP)

(73) Assignee: Sony Corporation (JP)

( * ) Notice: Subject to any disclaimer, the term of this patent is extended or adjusted under 35 U.S.C. 154(b) by 294 days.

(21) Appl. No.: 12/661,500

(22) Filed: Mar. 18, 2010

(65) Prior Publication Data

US 2010/0245784 A1     Sep. 30, 2010

(30) Foreign Application Priority Data

Mar. 31, 2009   (JP) ................ P2009-084145

(51) Int. Cl.
*G03B 21/28* (2006.01)

(52) U.S. Cl. ........... 353/99; 353/30; 353/31; 353/34; 353/69; 353/70; 353/77; 353/78; 353/98; 353/122; 359/365; 359/727

(58) Field of Classification Search ............ 353/30, 353/31, 34, 38, 69, 70, 77, 78, 98, 99, 122; 359/364, 726–736, 858, 859; 348/783
See application file for complete search history.

(56) References Cited

U.S. PATENT DOCUMENTS

| | | | |
|---|---|---|---|
| 6,208,468 B1 * | 3/2001 | Togino et al. | 359/637 |
| 6,612,704 B2 * | 9/2003 | Ogawa | 353/99 |
| 6,626,541 B2 * | 9/2003 | Sunaga | 353/69 |
| 6,690,517 B2 * | 2/2004 | Ohzawa et al. | 359/649 |
| 2001/0050758 A1 * | 12/2001 | Suzuki et al. | 353/69 |
| 2007/0184368 A1 | 8/2007 | Nishikawa et al. | |
| 2008/0068564 A1 * | 3/2008 | Abe et al. | 353/98 |
| 2009/0231690 A1 | 9/2009 | Nishikawa et al. | |

FOREIGN PATENT DOCUMENTS

| | | |
|---|---|---|
| JP | 2008-165202 A | 7/2008 |
| WO | WO-2006-043666 A1 | 4/2006 |

* cited by examiner

*Primary Examiner* — Georgia Y Epps
*Assistant Examiner* — Sultan Chowdhury
(74) *Attorney, Agent, or Firm* — Lerner, David, Littenberg, Krumholz & Mentlik, LLP

(57) ABSTRACT

A projection type image display apparatus includes: a light source; an illumination optical system that uniformly illuminates beams, which are emitted from the light source, on a surface of an image modulation element as a primary image plane; and a projection optical system that projects image information of the primary image plane modulated by the image modulation element on a screen as a secondary image plane in an enlarged manner. The projection optical system includes a first optical system having a positive refractive power and including a plurality of transmissive surfaces, and a second optical system having a positive refractive power and including a concave reflective surface. The first optical system has a first reflective surface disposed between any surfaces of the plurality of transmissive surfaces, and a second reflective surface disposed between the first optical system and second optical system.

6 Claims, 8 Drawing Sheets

FIG. 1A
FIG. 1B
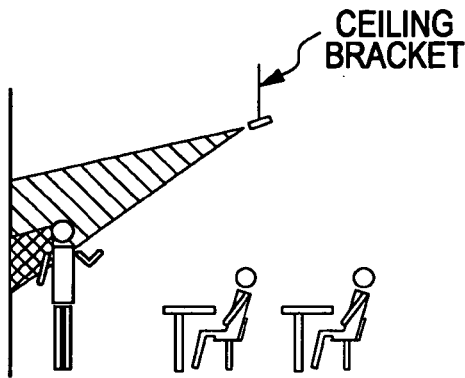
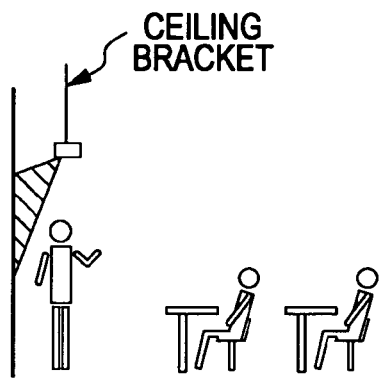
FIG. 2A
FIG. 2B
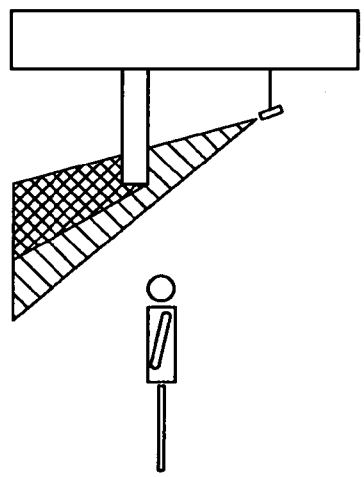
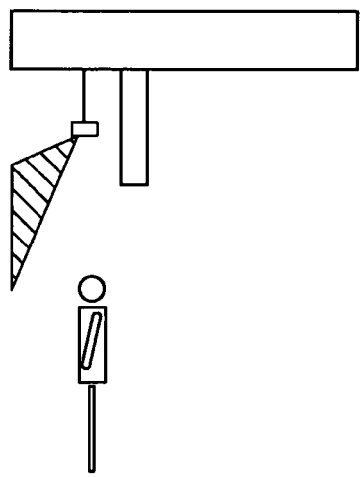
FIG. 3A
FIG. 3B
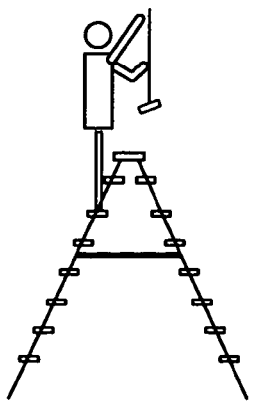
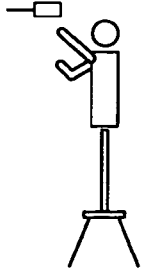

MEETING SPACE

CLASS ROOM, SEMINAR ROOM

FIG. 9

| | RADIUS OF CURVATURE | SPACE | nd | νd | NOTE |
|---|---|---|---|---|---|
| IMAGE DISPLAY ELEMENT | inf. | 3.400 | 1.51680 | 64.20 | |
| 2 | inf. | 6.400 | | | |
| 3 | inf. | 21.000 | 1.51680 | 64.20 | |
| 4 | inf. | 8.700 | | | |
| 5 | 49.086 | 8.303 | 1.48749 | 70.44 | |
| 6 | -80.849 | 0.300 | | | |
| 7 | 56.085 | 8.059 | 1.48749 | 70.44 | |
| 8 | -46.448 | 1.700 | 1.80610 | 40.73 | |
| 9 | -288.252 | 24.375 | | | |
| 10 | 160.626 | 1.300 | 1.80610 | 33.27 | |
| 11 | 24.537 | 11.979 | 1.48749 | 70.44 | |
| 12 | -18.500 | 1.300 | 1.74330 | 49.22 | |
| 13 | -83.212 | 0.300 | | | |
| 14 | 118.514 | 5.400 | 1.61293 | 36.96 | |
| 15 | -34.786 | 1.000 | | | |
| APERTURE DIAPHRAGM | inf. | 20.500 | | | |
| 17 | inf. | -21.292 | | | FIRST FLAT REFLECTIVE SURFACE |
| 18 | -32.115 | -4.651 | 1.51680 | 64.20 | |
| 19 | -51.103 | -0.300 | | | |
| 20 | -27.786 | -4.648 | 1.51680 | 64.20 | |
| 21 | -43.955 | -7.237 | | | |
| 22 | -181.942 | -1.500 | 1.69680 | 55.46 | |
| 23 | -26.808 | -8.000 | | | |
| 24 | 60.494 | -1.500 | 1.69680 | 55.46 | |
| 25 | -208.733 | -4.239 | | | |
| 26 | 351.949 | -8.200 | 1.51680 | 64.20 | |
| 27 | 44.395 | -11.266 | | | |
| 28 * | 2235.911 | -6.000 | 1.53113 | 55.70 | |
| 29 * | 235.619 | -55.000 | | | |
| 30 | inf. | 74.825 | | | SECOND FLAT REFLECTIVE SURFACE |
| 31 * | -75.607 | -150.000 | | | CONCAVE REFLECTIVE SURFACE |
| 33 | inf. | -3.000 | 1.51680 | 64.20 | PLANE PARALLEL PLATE |
| 34 | inf. | -714.812 | | | |
| SCREEN SURFACE | inf. | | | | |

FIG. 10

ASPHERIC COEFFICIENT

| SURFACE NUMBER | K | A1 | A2 | A4 | A6 | A8 | A10 | A12 | A14 |
|---|---|---|---|---|---|---|---|---|---|
| 28 | -34.457 | 0.000E+00 | 0.000E+00 | -1.253E-06 | 2.998E-08 | -1.202E-10 | 2.470E-13 | -2.566E-16 | 1.125E-19 |
| 29 | -199.112 | 0.000E+00 | 0.000E+00 | 1.234E-06 | 2.112E-08 | -8.092E-11 | 1.484E-13 | -1.362E-16 | 5.273E-20 |
| 31 | -3.790 | -2.289E-04 | -1.948E-03 | -2.885E-07 | 4.245E-11 | -3.820E-15 | -5.618E-19 | 1.715E-22 | -1.174E-26 |

FIG. 11

ECCENTRICITY DATA

| SURFACE NUMBER | x-AXIS ROTATION | y-AXIS ROTATION |
|---|---|---|
| 17 | 10 | 38 |
| 30 | −10 | −38 |

FIG. 12

| HORIZONTAL SIZE | 12.8 | |
|---|---|---|
| VERTICAL SIZE | 9.6 | |
| ELEMENT CENTER | −6.3198 | DISTANCE FROM OPTICAL AXIS IN y DIRECTION |

FIG. 13

| | CONDITIONAL EXPRESSION | EXAMPLE 1 |
|---|---|---|
| (1) | $20° < |\beta1| < 45°$ | 10 |
| (2) | $3° < |\alpha1| < 20°$ | 38 |
| (3) | $20° < |\beta2| < 45°$ | 10 |
| (4) | $3° < |\alpha2| < 20°$ | 38 |
| (5) | $-10° < \alpha1 + \alpha2 < 10°$ | 0 |
| (6) | $-10° < \beta1 + \beta2 < 10°$ | 0 |

PROJECTION TYPE IMAGE DISPLAY APPARATUS AND PROJECTION OPTICAL SYSTEM

CROSS-REFERENCE TO RELATED APPLICATION

The present application claims priority from Japanese Patent Application No. JP 2009-084145 filed in the Japanese Patent Office on Mar. 31, 2009, the entire content of which is incorporated herein by reference.

BACKGROUND OF THE INVENTION

1. Technical Field

The present invention relates to a projection type image display apparatus, which displays a projection image on a screen, and a projection optical system which is used in the projection type image display apparatus.

2. Description of the Related Art

In recent years, projector apparatuses have been widely known as a projection type display apparatus that displays a projection image on the screen. In particular, recently, there has been an increase in the demand for ultra-wide-angle front projection type image display apparatuses capable of displaying an image on a large screen while reducing a projection space. When using the ultra-wide-angle front projection type image display apparatuses, it is possible to project a beam diagonally onto the screen, and thus it is also possible to project an image on a large screen in a limited space. On the other hand, since occurrence of aberrations caused by an increase in angle of view increases, the size of the optical system tends to increase.

There have been proposed projection type image display apparatuses that are miniaturized by employing a flat mirror. Specifically, there has been proposed an apparatus capable of suppressing the size of the projection optical system in the depth direction in a state where it is small in a way that two flat mirrors are disposed between the first optical system and the second optical system constituting the projection optical system (for example, refer to International Publication Pamphlet No. 06-043666). Further, one flat mirror may be disposed on the first optical system constituting the projection optical system and another one flat mirror may be disposed between the first optical system and the second optical system constituting the projection optical system. With such a configuration, there has been proposed an apparatus capable of achieving a decrease in size of the projection optical system (for example, refer to Japanese Unexamined Patent Application Publication No. 2008-165202).

SUMMARY OF THE INVENTION

However, in the above-mentioned related art, sometimes it may be difficult to miniaturize the apparatus only by arranging the flat mirrors.

Accordingly, in the embodiments of the invention, when the reflective surfaces are disposed in the projection optical system, appropriate angles thereof are set. In such a manner, it is desirable to provide a projection optical system and a projection type image display apparatus capable of achieving miniaturization in the entire apparatus.

According to an embodiment of the invention, a projection type image display apparatus includes: a light source; an illumination optical system that uniformly illuminates beams, which are emitted from the light source, on a surface of an image modulation element as a primary image plane; and a projection optical system that projects image information of the primary image plane modulated by the image modulation element on a screen as a secondary image plane in an enlarged manner. The projection optical system includes a first optical system having a positive refractive power and including a plurality of transmissive surfaces, and a second optical system having a positive refractive power and including a concave reflective surface. The first optical system has a first reflective surface disposed between any surfaces of the plurality of transmissive surfaces, and a second reflective surface disposed between the first optical system and second optical system. Assuming that an optical axis is a z axis, a y-axis rotation angle of the first reflective surface is $\beta 1$, and a y-axis rotation angle of the second reflective surface is $\beta 2$, the following conditional expressions are satisfied: (1) $20° < |\beta 1| < 45°$, and (2) $20° < |\beta 2| < 45°$.

In the projection type image display apparatus having the above-mentioned configuration, the y-axis rotation angle of the first reflective surface is $20° < |\beta 1| < 45°$, and the y-axis rotation angle of the second reflective surface is $20° < |\beta 2| < 45°$. Here, assuming that the z axis is an optical axis, the y-axis and x-axis rotation angles are respectively defined as rotation angles in the xz and yz planes, and the anticlockwise rotation direction is set to be positive in all of the angles.

Thus, the first and second reflective surfaces in the projection optical system has the y-axis rotation angle the same as described above. Accordingly, as compared with the case where the y-axis rotation angle is misaligned from the above-mentioned range, the size in the xz plane, that is, the size of the projection type image display apparatus in the width and depth directions can be suppressed to be small.

According to the embodiments of the invention, by appropriately setting the y-axis rotation angles of the first and second reflective surfaces in the projection optical system, it is possible to decrease the size of the projection type image display apparatus in the width direction and the depth direction. Consequently, by appropriately arranging the reflective surfaces in the projection optical system, it is possible to decrease the entire apparatus.

BRIEF DESCRIPTION OF THE DRAWINGS

FIGS. 1A and 1B are an explanatory diagram (first) illustrating advantages of an ultra-wide-angle-capable liquid crystal projector apparatus;

FIGS. 2A and 2B are an explanatory diagram (second) illustrating advantages of an ultra-wide-angle-capable liquid crystal projector apparatus;

FIGS. 3A and 3B are an explanatory diagram (third) illustrating advantages of an ultra-wide-angle-capable liquid crystal projector apparatus;

FIG. 9 is an explanatory diagram illustrating a specific example of lens data of the projection optical system according to the embodiment of the invention;

FIG. 10 is an explanatory diagram illustrating a specific example of aspheric coefficients corresponding to the projection optical system according to the embodiment of the invention;

FIG. 11 is an explanatory diagram illustrating a specific example of eccentricity data in the projection optical system according to the embodiment of the invention;

FIG. 12 is an explanatory diagram illustrating a specific example of an image display element in the projection optical system according to the embodiment of the invention; and FIG. 13 is an explanatory diagram illustrating a specific example of numerical values of Conditional Expressions (1) to (6) in the projection optical system according to the embodiment of the invention.

DESCRIPTION OF THE PREFERRED EMBODIMENTS

Figure 4A:
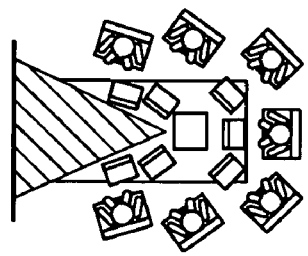
FIGS. 4A and 4B are an explanatory diagram (fourth) illustrating advantages of an ultra-wide-angle-capable liquid crystal projector apparatus.
Figure 4A:
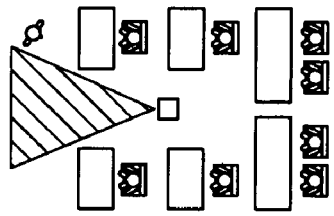
Figure 4B:
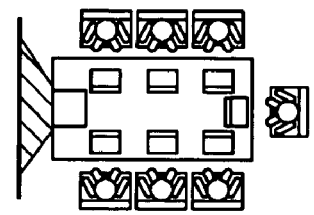
Figure 4B:
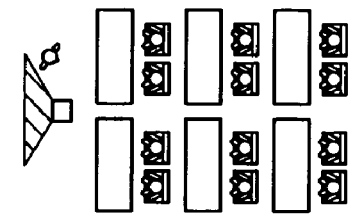
Figure 5A:
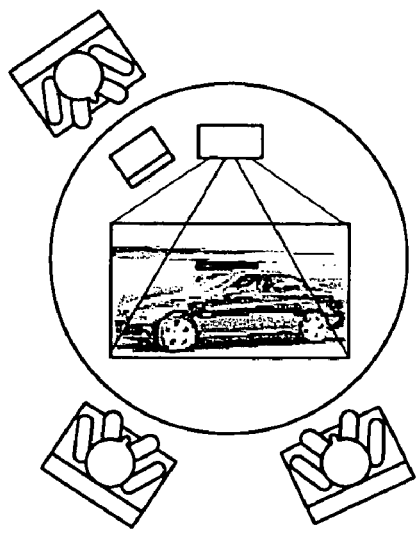
FIGS. 5A and 5B are an explanatory diagram (fifth) illustrating advantages of an ultra-wide-angle-capable liquid crystal projector apparatus.
Figure 5B:
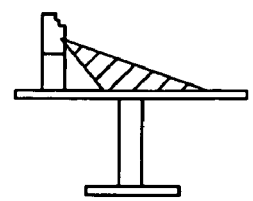

Hereinafter, the preferred embodiments (hereinafter, referred to as "embodiments") of the invention will be described. Furthermore, the description will be given in order of the following items.

1. Summary of Projection Type Image Display Apparatus
2. Schematic Exemplary Configurations of Projection Type Display Apparatus
3. Exemplary Configuration of Projection Optical System 1. Summary of Projection Type Image Display Apparatus First, the projection type image display apparatus is briefly described with reference to an example of a liquid crystal projector apparatus.

A liquid crystal projector apparatus is configured to form an optical image based on a video signal by allowing a liquid crystal display element as an image modulation element to modulate light, which is emitted from a light source such as a high-pressure mercury lamp, and to display the optical image on a screen by allowing a projection optical system to project the image in an enlarged manner. As such a liquid crystal projector apparatus, a so-called three plate type apparatus, which has a liquid crystal display element of a panel shape corresponding to R (red), G (green), and B (blue) colors, has been widely known.

However, in the ultra-wide-angle liquid crystal projector apparatus described herein, it is assumed that the projection optical system supports an ultra wide angle. For example, the projection optical system has a half angle of view of 60° or more.

Advantages of supporting the ultra wide angle are exemplified by the items described below.

FIGS. 1 to 5 are explanatory diagrams illustrating the advantages of the ultra-wide-angle-capable projection type image display apparatus.

The ultra-wide-angle capable apparatus has the following advantages. 1. It is possible to secure safety from light emitted from the apparatus since the light does not directly enter human eyes (for example, see FIGS. 1A and 1B). 2. It is possible to give effective presentation since a shadow is hardly projected on the screen (for example, see FIGS. 1A and 1B). 3. It is possible to perform installation free of obstacles on the ceiling since the necessary space for installation is small (for example, see FIGS. 2A and 2B). 4. It is easy to perform maintenance since the apparatus is able to project an image in a state where it is attached to a wall. In addition, it is also easy to perform wiring work since the distance between the personal computer (PC) and the audio-video equipment (AV equipment) becomes small (for example, see FIGS. 3A and 3B). 5. It is possible to increase the degree of freedom in installation for a meeting space, a class room, a conference room, or the like (for example, see FIGS. 4A and 4B). 6. It is possible to project an image from a table or the floor in a comparatively small space (for example, see FIGS. 5A and 5B).

Further, the demand for the apparatus has increased as the electronic board (Interactive White Board) has come into widespread use. The apparatus is also used not only in a school, an office, and the like, but also a digital signage (electronic advertisement) field. Although there are also various electronic boards using FPDs (Flat Panel Display) such as LCD (Liquid Crystal Display) and PDP (Plasma Display Panel), as compared therewith, the electronic board using the above-mentioned apparatus is a system configured to project an image of a liquid crystal panel having a size of one inch in an enlarged manner, and thus it is possible to provide a large screen with low costs. Further, an advantage significantly different from the FPDs is freely to change the screen size. Accordingly, one apparatus can be used for the various purposes as shown in FIGS. 1 to 5.

2. Schematic Exemplary Configurations of Projection Type Display Apparatus

Subsequently, a schematic configuration of the ultra-wide-angle-capable liquid crystal projector apparatus is described.

The liquid crystal projector apparatus includes a light source, an illumination optical system, and a projection optical system.

Figure 6A:
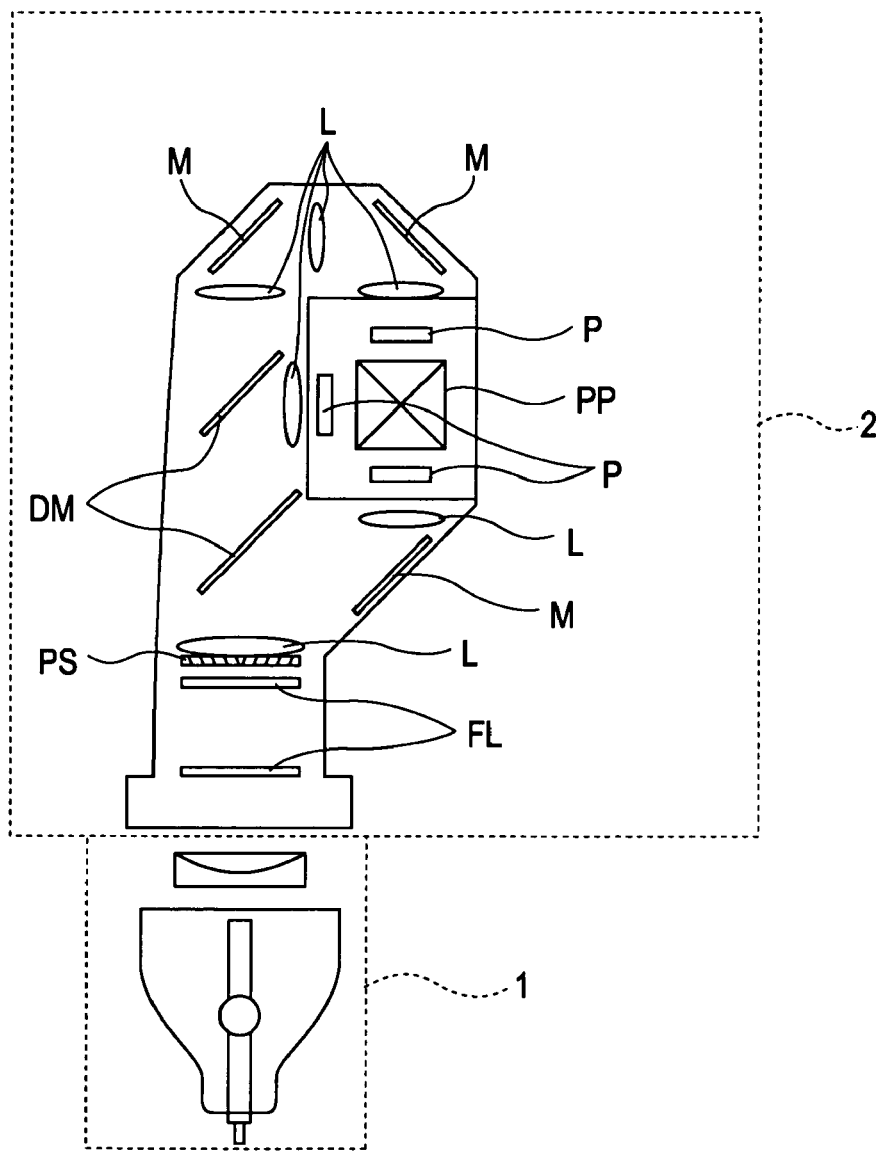
FIGS. 6A and 6B are an explanatory diagram illustrating a schematic exemplary configuration of a light source and an illumination optical system in the liquid crystal projector apparatus.
Figure 6B:
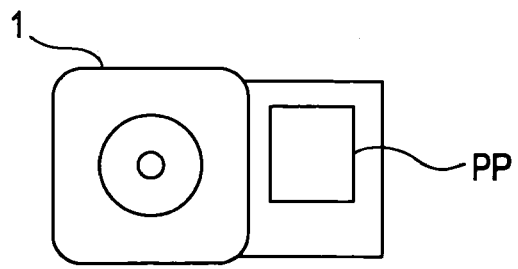

FIGS. 6A and 6B are an explanatory diagram illustrating a schematic exemplary configuration of a light source and an illumination optical system in the liquid crystal projector apparatus.

The light source 1 is formed as, for example, a high-pressure mercury lamp, and is configured to emit light beams to the illumination optical system 2.

The illumination optical system 2 is configured to uniformly illuminate the light beams, which are emitted from the light source 1, onto the surface of an image modulation element (a liquid crystal panel) as a primary image plane.

More specifically, in the illumination optical system 2, the light beams, which are emitted from the light source 1, pass through first and second fly-eye lenses FL, a polarized light conversion element PS, and a condensing lens L. Then, after passing through those, the light beams are separated into the respective RGB color component light beams by the dichroic mirror DM which reflects only the light in a specific wavelength region. The RGB color component light beams are incident on a liquid crystal panel P provided to correspond to the respective RGB colors by using a total reflection mirror M and the lens L. Then, after the liquid crystal panel P performs the optical modulation based on a picture signal, the respective color component light beams, which are optically modulated, are synthesized by a dichroic prism PP, and are emitted toward the projection optical system 3.

Furthermore, here, the illumination optical system 2 configured to employ a transmissive liquid crystal panel is exemplified, but the illumination optical system 2 may also be configured to employ a reflective liquid crystal panel. As the image modulation element, a digital micro mirror device (DMD) may be used. Further, it can be considered that, instead of the dichroic prism PP, a polarized beam splitter (PBS), a color synthesis prism for synthesizing a picture signal of the respective RGB colors, a TIR (Total Internal Reflection) prism, and the like may be used.

3. Exemplary Configuration of Projection Optical System

The projection optical system receives the light emitted from the illumination optical system 2, and thereby projects image information of the primary image plane, which is modulated by the liquid crystal panel P of the illumination optical system 2, on the screen as the secondary image plane.

The liquid crystal projector apparatus has a feature in the projection optical system. Hereinafter, the configuration of the projection optical system will be described.

However, in the case of the projection optical system using a reflective surface formed as a large curved surface, the size of the system in the height direction tends to increase in view of the entire configuration of the liquid crystal projector apparatus including a circuit board which drives the image modulation element, a light source, a cooling mechanism of the image modulation element which is heated by the light source, and the like. Thereby, the projection optical system used in the liquid crystal projector apparatus is configured as described below.

Figure 7A:
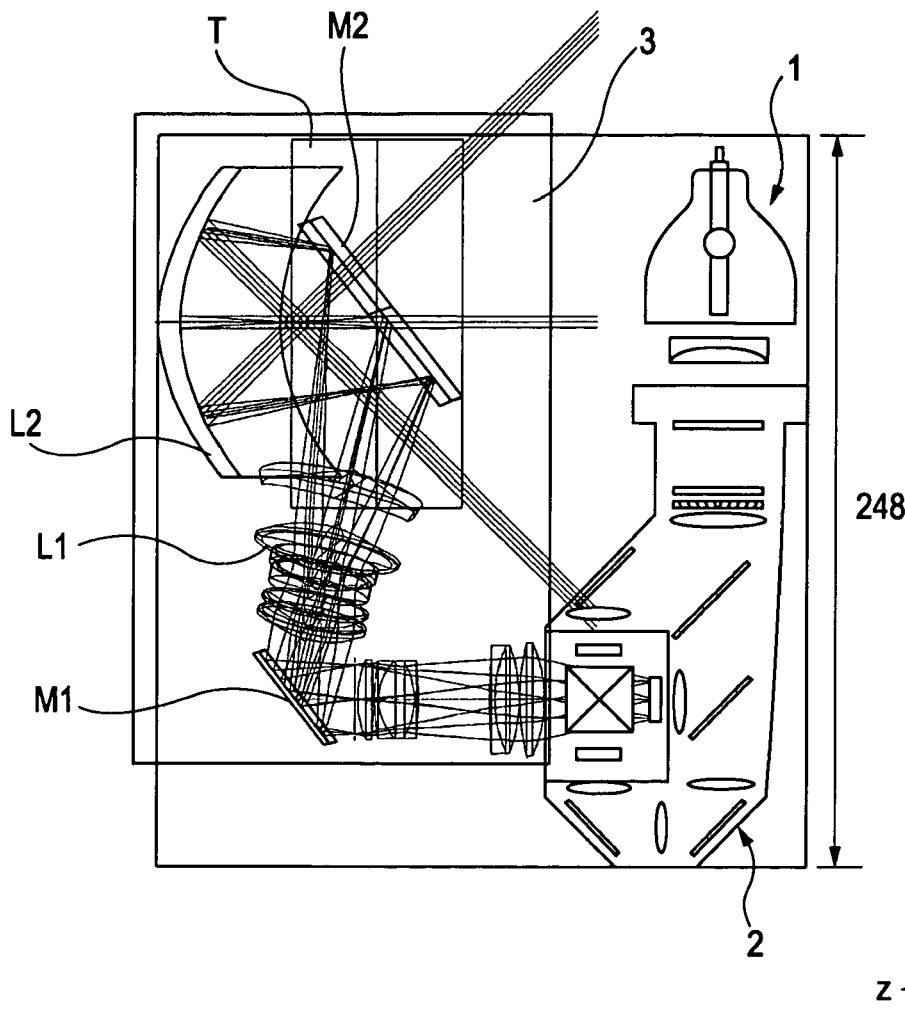
FIGS. 7A and 7B are an explanatory diagram illustrating a schematic exemplary configuration of a projection optical system according to an embodiment of the invention.
Figure 7B:
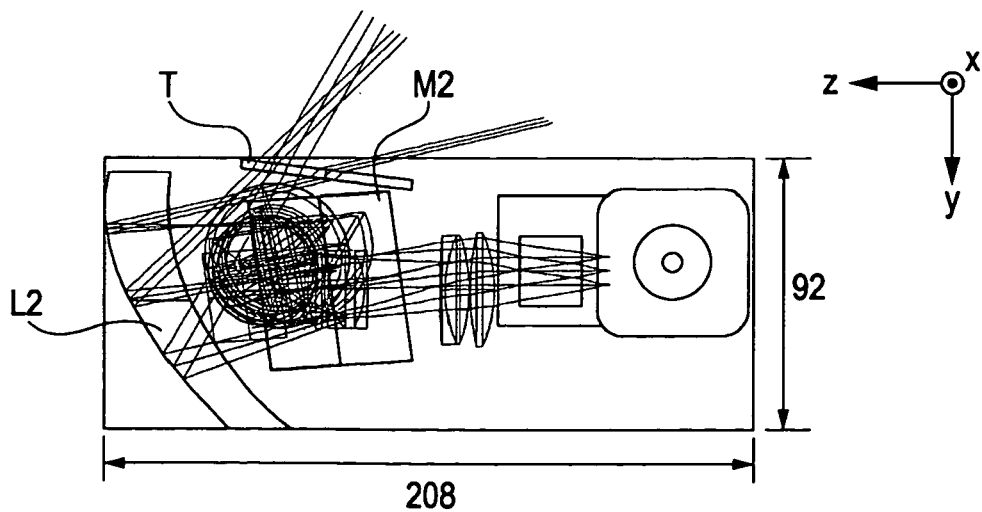
Figure 8:
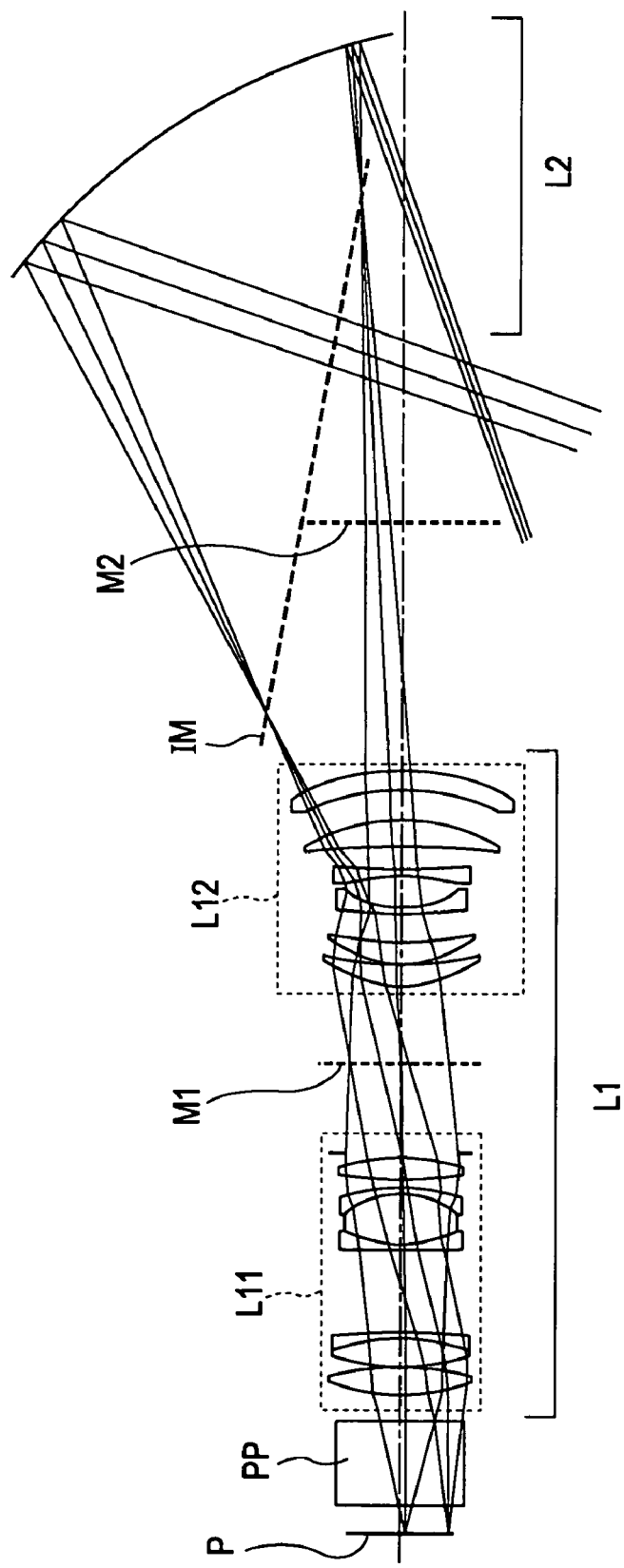
FIG. 8 is a ray tracing diagram illustrating a schematic exemplary configuration of the projection optical system shown in FIGS. 7A and 7B.

FIGS. 7A and 7B are an explanatory diagram illustrating a schematic exemplary configuration of the projection optical system according to the embodiment of the invention. FIG. 8 is a ray tracing diagram illustrating a schematic exemplary configuration of the projection optical system. Further, FIG. 8 shows ray tracing at the reference projection distance.

As shown in the example, the projection optical system 3 is configured to have a first optical system L1 and a second optical system L2.

The first optical system L1 has a positive refractive power, and includes a plurality of transmissive surfaces. Further, in the first optical system L1, all the optical components constituting the first optical system L1 has a common optical axis having a rotationally-symmetrical surface.

On the other hand, the second optical system L2 has a positive refractive power, and includes a concave reflective surface.

Here, the refractive power is defined as a degree of refraction of an optical system such as a lens (which is subjected to rotation in an axial rotation).

In addition, since the projection optical system 3 has the first optical system L1 and the second optical system L2, the projection optical system 3 is configured to project an image in an enlarged manner from the primary image plane on the reduction side to the secondary image plane on the magnification side. Consequently, in the configuration, the image information of the primary image plane, which is modulated by the liquid crystal panel P of the illumination optical system 2 and is synthesized by the dichroic prism PP, is projected on the screen as the secondary image plane in an enlarged manner.

In the projection optical system 3 having the configuration, the first optical system L1 is configured to include, in order from the side of the primary image plane, an eleventh optical system L11 with a positive refractive power and the twelfth optical system L12 with a negative refractive power. In addition, in the configuration, the light beams emitted from the first optical system L1 temporarily forms an intermediate image IM between the first optical system L1 and the second optical system L2, and is then incident into the second optical system L2.

Furthermore, in the projection optical system 3 of the illustrated example, a first flat reflective surface M1 is disposed any one space (for example, a space between the eleventh optical system L11 and the twelfth optical system L12) between a plurality of transmissive surfaces constituting the first optical system L1 in the projection optical system 3. Further, a second flat reflective surface M2 is disposed between the first optical system L1 and the second optical system L2. Further, a plane parallel plate T having transmissivity of a refractive index n is disposed between the second optical system L2 and the secondary image plane. There is also a dustproof effect, and thus it is effective to insert the plane parallel plate T between the second optical system L2 and the secondary image plane.

Furthermore, the general techniques may be applicable to achieve the detailed configuration (formation materials and the like) of the first flat reflective surface M1, the second flat reflective surface M2, and the plane parallel plate T. Hence, the description thereof is omitted herein.

Further, here, the first flat reflective surface M1 and the second flat reflective surface M2 are exemplified, but the reflective surfaces may not be formed as flat surfaces. That is, when the respective surfaces are formed as flat reflective surfaces, it is possible to design the projection optical system 3 easily, but instead of the flat surfaces, for example, curved surfaces may be used to realize the configuration.

However, the configuration has a distinctive feature in that the first flat reflective surface M1 and the second flat reflective surface M2 in the projection optical system 3 are disposed as described below.

Specifically, the first flat reflective surface M1 is disposed so that the y-axis rotation angle $\beta 1$ of the first flat reflective surface M1 and the x-axis rotation angle $\alpha 1$ of the first flat reflective surface M1 satisfy the following Conditional Expressions (1) and (3).

Further, the second flat reflective surface M2 is disposed so that the y-axis rotation angle $\beta 2$ of the second flat reflective surface M2 and the x-axis rotation angle $\alpha 2$ of the second flat reflective surface M2 satisfy the following Conditional Expressions (2) and (4).

Here, the y-axis rotation angle is defined as a rotation angle of the y axis rotation, and it is assumed that the anticlockwise rotation is set to be positive. Further, the x-axis rotation angle is defined as a rotation angle of the x axis rotation, and similarly it is assumed that the anticlockwise rotation is set to be positive. In these rotation angles, when the incident light is reflected in the same incident direction, the angle of the reflective surface is 0°.

$$20° < |\beta 1| < 45° \tag{1}$$

$$20° < |\beta 2| < 45° \tag{2}$$

$$3° < |\alpha 1| < 20° \tag{3}$$

$$3° < |\alpha 2| < 20° \tag{4}$$

The Conditional Expressions (1) and (2) define the decrease in size of the liquid crystal projector apparatus in the depth and width directions. That is, if the upper limit of Conditional Expression (1) is exceeded, the size of the liquid crystal projector apparatus in the depth direction increases. If the lower limit thereof is not reached, there is a concern that the eleventh optical system L11 and the twelfth optical system L12 interfere with each other. Further, if the upper limit of Conditional Expression (2) is exceeded, the size of the liquid crystal projector apparatus in the depth direction increases. If the lower limit thereof is not reached, there is a concern that the twelfth optical system L12 and the concave reflective surface of the second optical system L2 interfere with each other.

That is, as defined by Conditional Expressions (1) and (2), the first flat reflective surface M1 and the second flat reflective surface M2 have rotation angles about y axis, respectively. Accordingly, as compared with the case where the y-axis rotation angle is out of the range defined by Conditional Expressions (1) and (2), the size in the xz plane, that is, the size of the liquid crystal projector apparatus in the depth and width directions can be suppressed to be small.

Accordingly, when the first flat reflective surface M1 and the second flat reflective surface M2 are disposed as defined by Conditional Expressions (1) and (2), it is possible to achieve the decrease in size of the liquid crystal projector apparatus in the depth and width directions.

For example, the configuration disclosed in the International Publication Pamphlet No. 06-043666 is suitable for the optical system configured to reduce its size only in the depth direction like the thin type projection television. However, it is difficult to say that the configuration is able to decrease the size thereof in the width and height directions. In this point of view, according to the configuration described in the embodiment, it is possible to decrease the size of the liquid crystal projector apparatus in both of the depth and width directions.

Further, Conditional Expressions (3) and (4) mentioned above defines a decrease in size of the apparatus in the height direction. That is, if the upper limit of Conditional Expression (3) is exceeded, the size of the apparatus including the cooling mechanism in the height direction increases. If the lower limit thereof is not reached, the size of the apparatus including the driving circuit board in the height direction increases. Further, if the upper limit of Conditional Expression (4) is exceeded, the size of the apparatus including the cooling mechanism in the height direction increases. If the lower limit thereof is not reached, the size of the apparatus including the driving circuit board in the height direction increases.

That is, as defined by Conditional Expressions (3) and (4), the first flat reflective surface M1 and the second flat reflective surface M2 have rotation angles about the x axis, respectively. Accordingly, as compared with the case where the x-axis rotation angle is out of the range defined by Conditional Expressions (3) and (4), the size in the direction of y-axis perpendicular to the xz plane, that is, the size of the liquid crystal projector apparatus in the height direction can be suppressed to be small.

Accordingly, when the first flat reflective surface M1 and the second flat reflective surface M2 are disposed as defined by Conditional Expressions (3) and (4), it is possible to achieve the decrease in size of the liquid crystal projector apparatus in the height direction.

For example, the configuration disclosed in the International Publication Pamphlet No. 06-043666 or Japanese Unexamined Patent Application Publication No. 2008-165202, the reflection mirror is used. However, when the reflection mirror is generally used, the reflection mirror is disposed to be misaligned in the height direction from the optical axis of the optical system, and thus it is theoretically difficult to decrease the size in the height direction. Consequently, in the related-art configuration, it is difficult to say that the configuration is able to decrease the size of particularly the entire apparatus in the height direction. In this point of view, according to the configuration described in the embodiment, it is possible reliably to decrease the size of the liquid crystal projector apparatus in the height direction.

Furthermore, the first flat reflective surface M1 and the second flat reflective surface M2 are disposed so as to satisfy the following Conditional Expressions (5) and (6).

$$-10°<\alpha 1+\alpha 2<10° \quad (5)$$

$$-10°<\beta 1+\beta 2<10° \quad (6)$$

The above-mentioned Conditional Expressions (5) and (6) are effective particularly when a mercury lamp is used as a light source. That is, Conditional Expressions (5) and (6) are conditions for allowing the arc portion of the light source to be substantially horizontal, and if the upper and lower limits are exceeded, lifetime of the light source may rapidly deteriorate. Furthermore, the condition defined by Conditional Expression (5) is effective when the surface, such as a wall or an electronic blackboard, perpendicular to the ground is formed as a projection surface (for example, see FIGS. 1A and 1B). Further, the condition defined by Conditional Expression (6) is effective when the projection is performed on a table (for example, see FIGS. 5A and 5B). By satisfying any one of Conditional Expressions (5) and (6), the configuration is able to correspond to all the projection forms. Further, the illumination optical system is configured to be close to the screen side, and thus it becomes easy to let out the terminals and the like from the driving circuit board or exhaust from the cooling mechanism to the screen side. With such a configuration, by installation shown in FIG. 1 or 3A and 3B, wires and the like can be housed so as not to be noticed. Furthermore, in the meeting style shown in FIGS. 4A and 4B, there is an advantage in that there is little chance to expose the direct exhaust. Further, since the terminals and the like and the exhaust port are provided on one side of the apparatus close to the screen side, it can be said that it becomes easy to design the appearance thereof.

FIG. 9 is an explanatory diagram illustrating a specific example of lens data of the projection optical system. In the drawing, the reference sign * represents the surface formed as an aspheric surface, and the following Expression (7) is given. The reference sign nd represents a refractive index at the d-line (587.56 nm), and similarly the reference sign vd represents an Abbe number at the d-line.

Numerical Expression 1

$$Z = \frac{ch^2}{1+\{1-(1+K)c^2h^2\}1/2} + \sum_{i=1} A i h^i \quad (7)$$

FIG. 10 is an explanatory diagram illustrating a specific example of aspheric coefficients corresponding to the projection optical system. The aspheric coefficients of the illustrated example correspond to the above-mentioned Expression (7).

FIG. 11 is an explanatory diagram illustrating a specific example of eccentricity data in the projection optical system. FIG. 12 is an explanatory diagram illustrating a specific example of an image display element in the projection optical system.

FIG. 13 is an explanatory diagram illustrating a specific example of numerical values of Conditional Expressions (1) to (6) in the projection optical system.

In the detailed numerical value example shown in FIGS. 9 to 13 as described above, the numerical values are set as values at the time of 80" projection.

When the projection optical system 3 is configured by the numerical value examples shown in the drawings, the size of the liquid crystal projector apparatus in the height direction is suppressed, for example, by around 110 mm. Further, it can be figured out that only the appearance of the concave reflective surface is restricted.

That is, when the first flat reflective surface M1 and the second flat reflective surface M2 are disposed so as to satisfy all Conditional Expressions (1) to (6), the appropriate arrangement of the reflective surfaces M1 and M2 is very effective in the decrease in size of the entire liquid crystal projector apparatus.

Further, in the above-mentioned embodiment, the specific appropriate examples of the invention are described, but the invention is not limited to the description thereof.

In particular, the numerical values and the specific shapes of the respective components exemplified by the embodiment are only illustrative examples of the embodiment for carrying out the invention, and they should not be interpreted as limiting the technical scope of the invention.

Further, for example, in the above-mentioned embodiment, the liquid crystal projector apparatus is exemplified as a projection type display apparatus. However, the embodiment of the invention is applicable in the same manner even when an otherwise projection type display apparatus, that is, an apparatus other than the liquid crystal panel is used as the image modulation element.

Furthermore, for example, in the above-mentioned embodiment, the appropriate projection optical system as an optical system of a projection type display apparatus is described. However, it is apparent that an optical system for an image capture apparatus (for example, a digital camera, a surveillance camera, and a painting camera) may be used.

As described above, the invention is not limited to the examples mentioned above, and various modifications and variations may be made without departing from the technical scope of the invention.

What is claimed is:

1. A projection type image display apparatus comprising:
a light source;
an illumination optical system that uniformly illuminates beams, which are emitted from the light source, on a surface of an image modulation element as a primary image plane; and
a projection optical system that projects image information of the primary image plane modulated by the image modulation element on a screen as a secondary image plane in an enlarged manner,
wherein the projection optical system includes
a first optical system that has a positive refractive power and includes a plurality of transmissive surfaces, and
a second optical system that has a positive refractive power and includes a concave reflective surface,
wherein the first optical system has
a first reflective surface disposed between any surfaces of the plurality of transmissive surfaces, and
a second reflective surface disposed between the first optical system and second optical system, and
wherein assuming that an optical axis is a z axis, a y-axis rotation angle of the first reflective surface is $\beta 1$, and a y-axis rotation angle of the second reflective surface is $\beta 2$, the following conditional expressions are satisfied $$20°<|\beta 1|<45° \tag{1}$$

$$20°<|\beta 2|<45°. \tag{2}$$

2. The projection type image display apparatus according to claim 1, wherein assuming that an x-axis rotation angle of the first reflective surface is $\alpha 1$ and an x-axis rotation angle of the second reflective surface is $\alpha 2$, the following conditional expressions are satisfied $$3°<|\alpha 1|<20° \tag{3}$$

$$3°<|\alpha 2|<20°. \tag{4}$$

3. The projection type image display apparatus according to claim 1, wherein the following conditional expressions are satisfied $$-10°<\alpha 1+\alpha 2<10° \tag{5}$$

$$-10°<\beta 1+\beta 2<10°. \tag{6}$$

4. A projection type image display apparatus comprising:
a light source;
an illumination optical system that uniformly illuminates beams, which are emitted from the light source, on a surface of an image modulation element as a primary image plane; and
a projection optical system that projects image information of the primary image plane modulated by the image modulation element on a screen as a secondary image plane in an enlarged manner,
wherein the projection optical system includes
a first optical system that has a positive refractive power and includes a plurality of transmissive surfaces, and
a second optical system that has a positive refractive power and includes a concave reflective surface,
wherein the first optical system has
a first reflective surface disposed between any surfaces of the plurality of transmissive surfaces, and
a second reflective surface disposed between the first optical system and second optical system, and
wherein assuming that an optical axis is a z axis, a y-axis rotation angle of the first reflective surface is $\beta 1$, a y-axis rotation angle of the second reflective surface is $\beta 2$, an x-axis rotation angle of the first reflective surface is $\alpha 1$, and an x-axis rotation angle of the second reflective surface is $\alpha 2$, the following conditional expressions are satisfied $$20°<|\beta 1|<45° \tag{1}$$

$$20°<|\beta 2|<45° \tag{2}$$

$$3°<|\alpha 1|<20° \tag{3}$$

$$3°<|\alpha 2|<20° \tag{4}$$

$$-10°<\alpha 1+\alpha 2<10° \tag{5}$$

$$-10°<\beta 1+\beta 2<10°. \tag{6}$$

5. The projection type image display apparatus according to claim 1, wherein all the first and second reflective surfaces are flat reflective surfaces.

6. A projection optical system comprising:
a first optical system that has a positive refractive power and includes a plurality of transmissive surfaces, and
a second optical system that has a positive refractive power and includes a concave reflective surface,
wherein the projection optical system is configured to project an image in an enlarged manner from a primary image plane on a reduction side to a secondary image plane on a magnification side,
wherein the first optical system has
a first reflective surface disposed between any surfaces of the plurality of transmissive surfaces, and
a second reflective surface disposed between the first optical system and second optical system, and
wherein assuming that an optical axis is a z axis, a y-axis rotation angle of the first reflective surface is $\beta 1$, a y-axis rotation angle of the second reflective surface is $\beta 2$, an x-axis rotation angle of the first reflective surface is $\alpha 1$, and an x-axis rotation angle of the second reflective surface is $\alpha 2$, the following conditional expressions are satisfied $$20°<|\beta 1|<45° \tag{1}$$

$$20°<|\beta 2|<45° \tag{2}$$

$$3°<|\alpha 1|<20° \tag{3}$$

$$3°<|\alpha 2|<20° \tag{4}$$

$$-10°<\alpha 1+\alpha 2<10° \tag{5}$$

$$-10°<\beta 1+\beta 2<10°. \tag{6}$$

* * * * *